United States Patent
Mobin et al.

(10) Patent No.: US 7,869,540 B2
(45) Date of Patent: Jan. 11, 2011

(54) METHOD AND APPARATUS FOR INCREASED COMMUNICATION CHANNEL PRE-EMPHASIS FOR CLOCK-LIKE DATA PATTERNS

(75) Inventors: Mohammad S. Mobin, Orefield, PA (US); Gregory W. Sheets, Breinigsville, PA (US); Lane A. Smith, Easton, PA (US); Vladimir Sindalovsky, Perkasie, PA (US)

(73) Assignee: Agere Systems Inc., Allentown, PA (US)

( * ) Notice: Subject to any disclaimer, the term of this patent is extended or adjusted under 35 U.S.C. 154(b) by 1180 days.

(21) Appl. No.: 11/506,536

(22) Filed: Aug. 18, 2006

(65) Prior Publication Data
US 2008/0043876 A1    Feb. 21, 2008

(51) Int. Cl.
  *H04L 25/49*  (2006.01)
  *H04L 25/03*  (2006.01)
  *H04K 1/02*   (2006.01)

(52) U.S. Cl. .................. 375/296; 375/224; 375/285; 375/295

(58) Field of Classification Search .............. 375/296, 375/295, 285, 224
See application file for complete search history.

(56) References Cited

U.S. PATENT DOCUMENTS

2007/0025488 A1*  2/2007  Ho et al. ............. 375/372
2007/0268984 A1* 11/2007  Abel et al. ........... 375/285

* cited by examiner

*Primary Examiner*—Ted M Wang
(74) *Attorney, Agent, or Firm*—Ryan, Mason & Lewis, LLP

(57) ABSTRACT

Methods and apparatus are disclosed for increased pre-emphasis for clock-like data patterns to compensate for channel distortions. One aspect of the invention compensates for channel distortions by evaluating a data pattern to be transmitted; determining if the data pattern satisfies one or more predefined criteria defining a clock-like data pattern; and generating a pre-emphasis level for the clock-like data patterns that is higher than a pre-emphasis level for the data patterns that do not satisfy the one or more predefined criteria. For example, a predefined window size can be defined for determining if the data pattern satisfies the one or more predefined criteria defining the clock-like data pattern. In one exemplary implementation, the higher pre-emphasis level is generated for one or more predefined data patterns. A table can optionally be accessed to determine the pre-emphasis level based on the data pattern.

20 Claims, 5 Drawing Sheets

| DATA PATTERN (PRECEDING, CURRENT AND SUBSEQUENT BITS) | PRE-EMPHASIS FOR DATA BIT | CURRENT SOURCE CONFIGURATION |
|---|---|---|
| 000 | STEADY DATA | $-I_1 + I_2 + I_3$ |
| 001 | LEAD | $-I_1 - I_2 + I_3$ |
| 010 | CLOCK | $I_1 + I_2 + I_3$ |
| 011 | LAG | $I_1 - I_2 + I_3$ |
| 100 | LAG | $-I_1 + I_2 - I_3$ |
| 101 | CLOCK | $-I_1 - I_2 - I_3$ |
| 110 | LEAD | $I_1 + I_2 - I_3$ |
| 111 | STEADY DATA | $I_1 - I_2 - I_3$ |

FIG. 5

| DATA PATTERN (PRECEDING, CURRENT AND SUBSEQUENT BITS) | PRE-EMPHASIS FOR DATA BIT | CURRENT SOURCE CONFIGURATION |
|---|---|---|
| 000 | STEADY DATA | $-I_1 + I_2 + I_3$ |
| 001 | LEAD | $-I_1 - I_2 + I_3$ |
| 010 | CLOCK | $I_1 + I_2 + I_3$ |
| 011 | LAG | $I_1 - I_2 + I_3$ |
| 100 | LAG | $-I_1 + I_2 - I_3$ |
| 101 | CLOCK | $-I_1 - I_2 - I_3$ |
| 110 | LEAD | $I_1 + I_2 - I_3$ |
| 111 | STEADY DATA | $I_1 - I_2 - I_3$ |

METHOD AND APPARATUS FOR
INCREASED COMMUNICATION CHANNEL
PRE-EMPHASIS FOR CLOCK-LIKE DATA
PATTERNS

FIELD OF THE INVENTION

The present invention is related to techniques for compensating for channel distortions and, more particularly, to improved pre-emphasis techniques that compensate for channel distortions.

BACKGROUND OF THE INVENTION

Digital communication receivers often sample an analog waveform and then reliably detect the sampled data. Signals arriving at a receiver are typically corrupted by intersymbol interference (ISI), crosstalk, echo, and other noise. In order to compensate for such channel distortions, communication systems often employ well-known pre-emphasis techniques in the transmitter or equalization techniques in the receiver (or both). On the receiver side, well-known zero equalization or decision-feedback equalization (DFE) techniques (or both) are often employed.

A communication channel typically exhibits a low pass effect on a transmitted signal. Conventional pre-emphasis employed by a transmitter attempt to open the received data eye that has been band limited by the low pass channel response. Thus, the channel will generally impair the higher frequency components of a transmitted signal more than the lower frequency components. While existing pre-emphasis techniques effectively compensate for channel distortions, they suffer from a number of limitations, which if overcome, could further improve the reliability of data detection in the presence of channel distortions.

A need exists for improved pre-emphasis techniques that amplify the high frequency content of transmitted data. A further need exists for methods and apparatus for applying increased pre-emphasis to higher frequency components of a transmitted signal, such as clock-like data patterns.

SUMMARY OF THE INVENTION

Generally, methods and apparatus are disclosed for increased pre-emphasis for clock-like data patterns to compensate for channel distortions. One aspect of the invention compensates for channel distortions by evaluating a data pattern to be transmitted; determining if the data pattern satisfies one or more predefined criteria defining a clock-like data pattern; and generating a pre-emphasis level for the clock-like data patterns that is higher than a pre-emphasis level for the data patterns that do not satisfy the one or more predefined criteria. For example, a predefined window size can be defined for determining if the data pattern satisfies the one or more predefined criteria defining the clock-like data pattern. In one exemplary implementation, the higher pre-emphasis level is generated for one or more predefined data patterns. A table can optionally be accessed to determine the pre-emphasis level based on the data pattern.

A more complete understanding of the present invention, as well as further features and advantages of the present invention, will be obtained by reference to the following detailed description and drawings.

BRIEF DESCRIPTION OF THE DRAWINGS

FIG. 5 is a sample table describing an exemplary pre-emphasis assignment table 500 incorporating features of the present invention;

DETAILED DESCRIPTION

The disclosed pre-emphasis techniques amplify the high frequency content of transmitter data. In addition, the disclosed methods and apparatus apply increased pre-emphasis to clock-like data patterns. In one exemplary embodiment, the data pattern is observed and a pre-emphasis level is selected for the current bit based on the observed data pattern.

Figure 1:
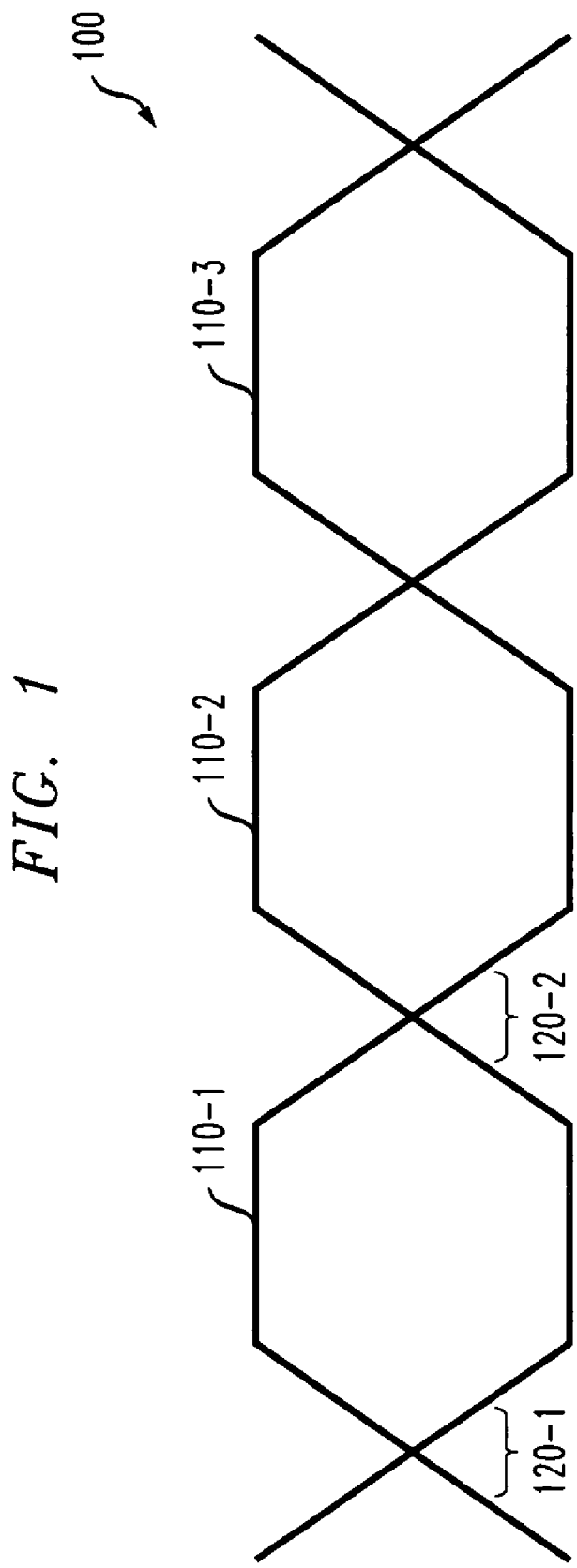
FIG. 1 graphically illustrates a number of ideal data eyes associated with a signal.

FIG. 1 graphically illustrates a number of ideal data eyes 110-1 through 110-3 associated with a signal 100. Although the ideal data eyes 110 shown in FIG. 1 do not exhibit any noise for ease of illustration, each data eye 110 is typically a superposition of a number of individual signals with varying frequency components, in a known manner. The time between the approximate center of two zero-crossing points 120-1, 120-2 corresponds to the unit interval of the data eye. It is noted that in the presence of a noisy signal, such as noise resulting from significant channel distortion, the data eyes 110 will exhibit a wider zero crossing point. There is an inverse correlation between the statistical variation between the zero-crossing points 120-1, 120-2 and the degree of openness of each data eye 110. Thus, as the width of the zero-crossing points 120-1, 120-2 increases, the degree of openness of each data eye 110 decreases.

Figure 2A:
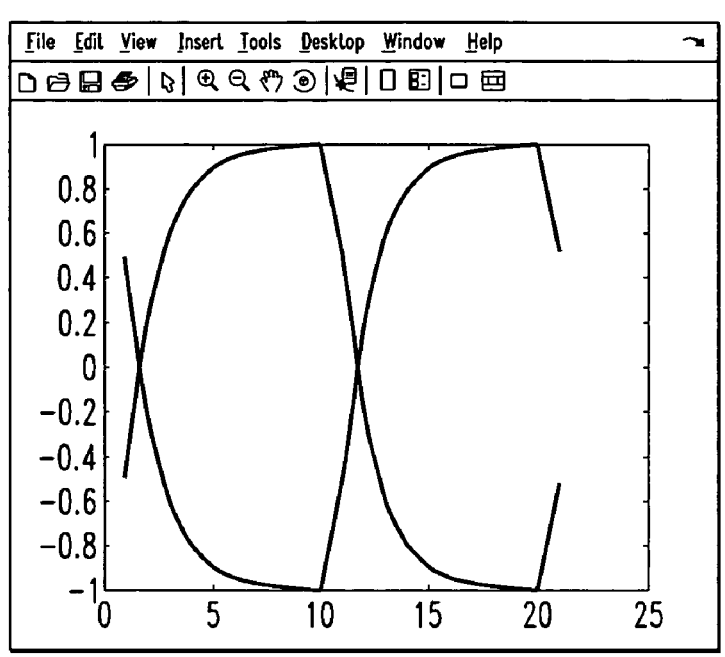
FIGS. 2A and 2B illustrate the distortion that can arise from a channel.
Figure 2B:
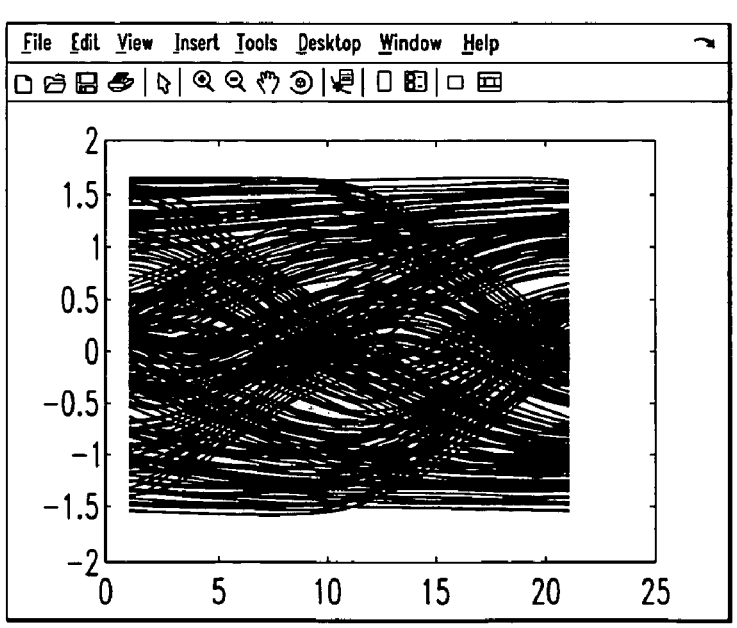

FIGS. 2A and 2B illustrate the distortion that can arise from a channel. FIG. 2A illustrates an ideal transmitter output 200. FIG. 2B illustrates the data eye 210 at the receiver that results from the channel distortion, when no channel compensation is applied. As evident in FIG. 2B, the data eye 210 is essentially closed due to the channel distortion.

The present invention recognizes that existing pre-emphasis techniques can be improved by applying increased pre-emphasis to higher frequency components of a transmitted signal, such as clock-like data patterns. While existing pre-emphasis techniques apply the same pre-emphasis for all data patterns, the present invention enhances the high frequency components of clock like data patterns by increasing the pre-emphasis for clock like data patterns. In one exemplary implementation, discussed further below in conjunction with FIG. 7, the increased pre-emphasis is obtained by using an additional current source.

Figure 3:
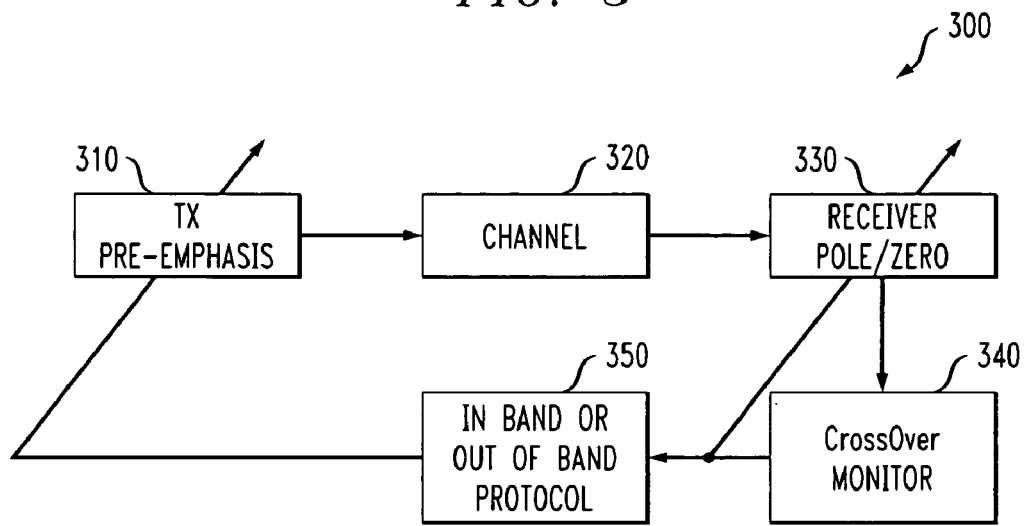
FIG. 3 illustrates an exemplary signal flow for a channel compensation technique implemented in accordance with the present invention.

FIG. 3 illustrates an exemplary signal flow 300 for a channel compensation technique implemented in accordance with the present invention. As shown in FIG. 3, pre-emphasis techniques 310 are applied in the transmitter before the signal is transmitted over a channel 320. In addition, equalization techniques 330, such as zero equalization, are optionally applied in the receiver. An optional cross over monitor 340 implements a channel compensation parameter optimization process, for example, as described in U.S. patent application Ser. No. 11/434,687, filed May 16, 2006, entitled "Method and Apparatus for Determining One or More Channel Compensation Parameters Based on Data Eye Monitoring," to determine when one or more of the pre-emphasis 310 and equalization 330 have sufficiently compensated for the channel distortion. When pre-emphasis techniques 310 are applied in the transmitter, the output of the cross over monitor 340 is fed back to the transmitter using an in-band or out of band protocol 350.

Figure 4:
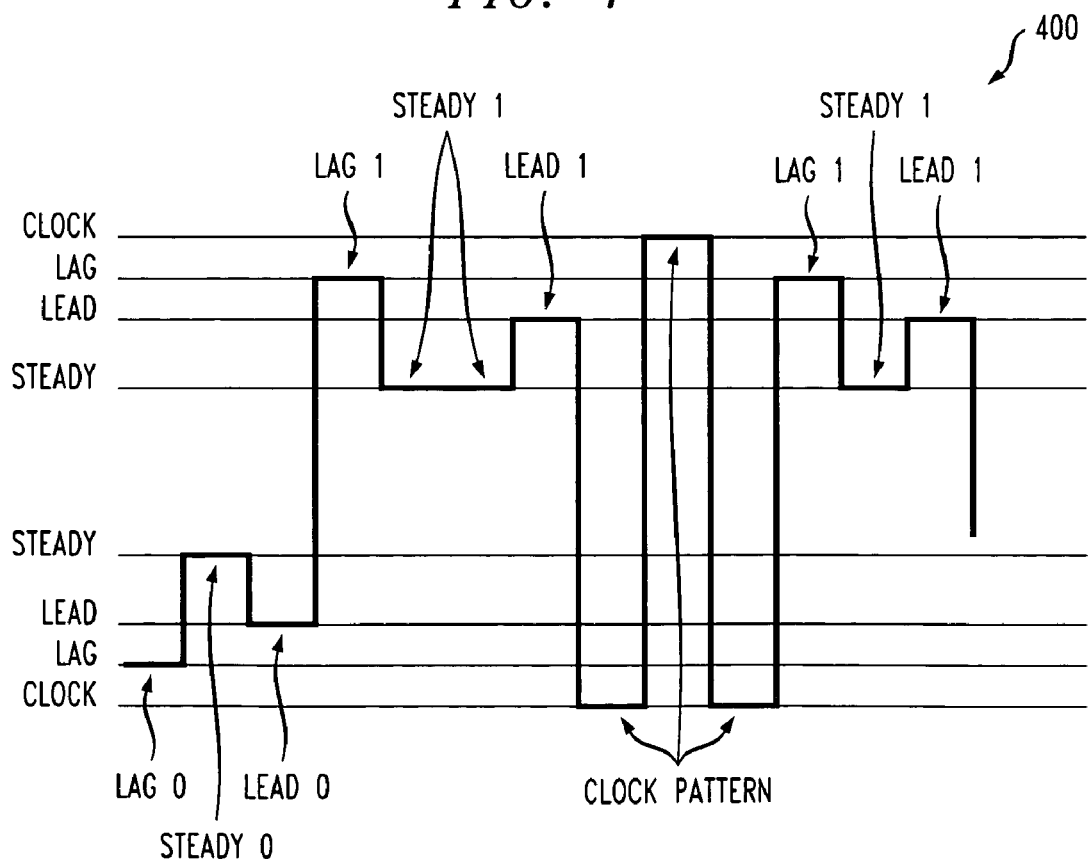
FIG. 4 illustrates the application of pre-emphasis in accordance with the present invention for an exemplary 3-tap finite impulse response (FIR) filter.

FIG. 4 illustrates the application of pre-emphasis (clock pattern emphasis) in accordance with the present invention for an exemplary 3-tap finite impulse response (FIR) filter. After a transmitted signal travels through a channel having a low pass effect, the high frequency boost associated with the pre-emphasis techniques of the present invention will compensate for channel impairments and the desired frequency content of the data will be retained. The performance of the pre-emphasis process is improved by selectively giving additional boost for clock like data patterns to further improve the existing pre-emphasis performance.

Generally, as shown in FIG. 4, when determining how much pre-emphasis to apply for a current bit, an exemplary implementation of the present invention evaluates the values of the preceding bit and the subsequent bit. Conventional pre-emphasis techniques employ three current sources in order to weight the lead, lag, and steady data bits. In exemplary embodiments of the present invention, four pre-emphasis levels (steady data, lead, lag and clock levels) are obtained using three or four current sources, as discussed further below in conjunction with FIGS. 6 and 7, respectively. The signal level associated with each data pattern is shown in FIG. 5.

FIG. 5 is a sample table describing an exemplary pre-emphasis assignment table 500 incorporating features of the present invention. As shown in FIG. 5, for each possible three bit data pattern of preceding, current and subsequent bits, the table 500 identifies the pre-emphasis level that should be applied for the data bit. In addition, a corresponding current source configuration is also provided that indicates the polarity of each current source that is used to obtain the desired pre-emphasis level (lead, lag, steady or clock).

Figure 6:
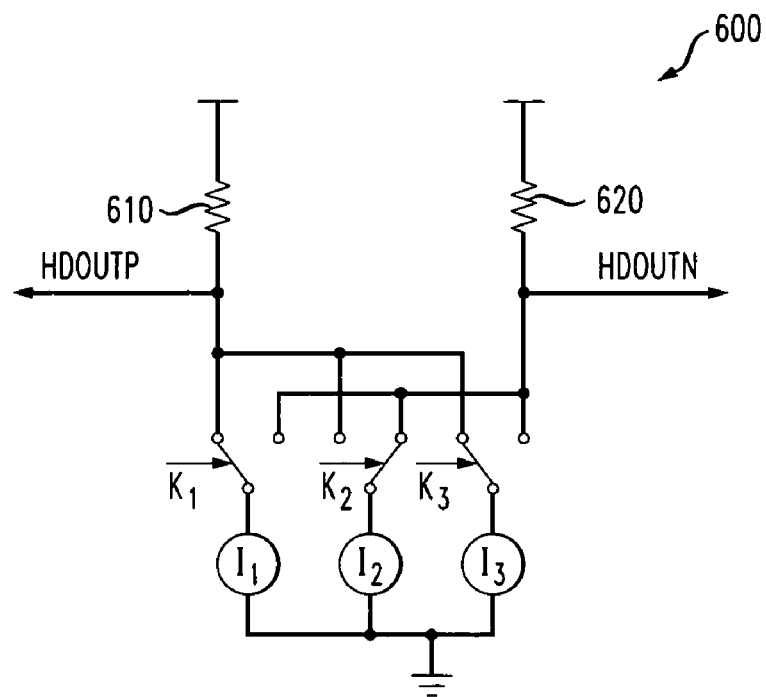
FIG. 6 is a schematic diagram of an exemplary pre-emphasis circuit having three current sources $I_1$, $I_2$ and $I_3$ that may be employed in one embodiment of the invention.

FIG. 6 is a schematic diagram of an exemplary pre-emphasis circuit 600 having three current sources $I_1$, $I_2$ and $I_3$ that may be employed in one embodiment of the invention. The pre-emphasis circuit 600 is generating the data bit in a known manner. The value of control signals $K_1$ through $K_3$ determine the position of corresponding switches and thus whether the generated current goes through a first or second resistor 610, 620. In an algebraic current combination, each current source can be assigned a percentage of current, such as 80%, 20% and 10%, for an exemplary maximum current of 110%. The pre-emphasis circuit 600 of FIG. 6 can generate three independent levels and a fourth level that depends on the other three levels.

The present invention first detects the data pattern, and then selects an appropriate pre-emphasis level for the data bit based on the exemplary assignment of FIG. 5. For example, based on the exemplary assignments in FIG. 5, to generate the "lead" pre-emphasis level, associated with a data pattern of 001, the first and second current sources, $I_1$ and $I_2$, are placed in a negative position (through resistor 620) and the third current source, $I_3$, is placed in a positive position (through resistor 610) to obtain the desired level $(-I_1-I_2+I_3)$.

Figure 7:
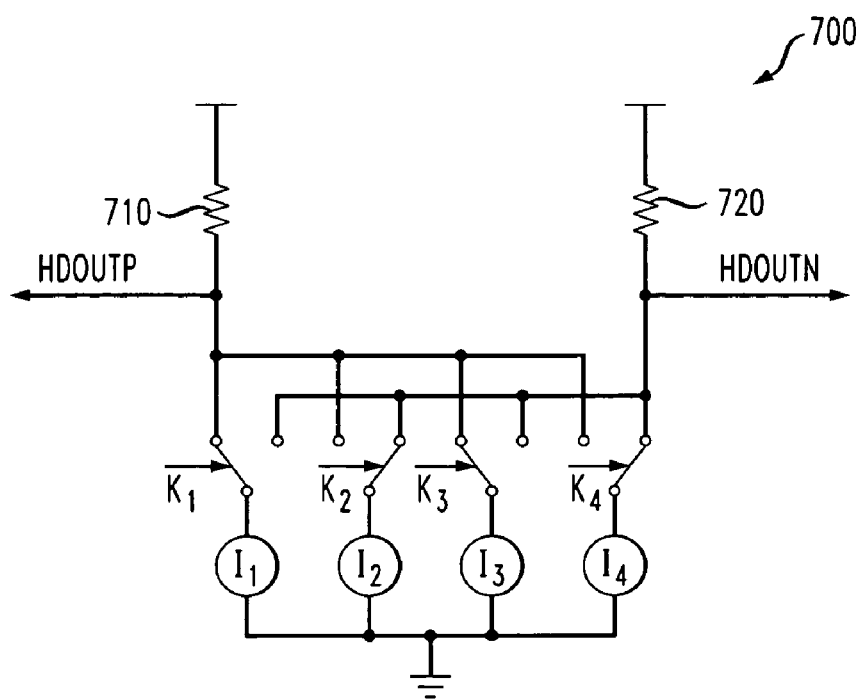
FIG. 7 is a schematic diagram of an exemplary pre-emphasis circuit having four current sources $I_1$, $I_2$, $I_3$ and $I_4$, that may be employed in one embodiment of the invention.

FIG. 7 is a schematic diagram of an exemplary pre-emphasis circuit 700 having four current sources $I_1$, $I_2$, $I_3$ and $I_4$, that may be employed in one embodiment of the invention. The control signals, K, and current sources, I, operate in the same manner as described above in conjunction with FIG. 6. The pre-emphasis circuit 700 of FIG. 7 can generate four independent levels, in a known manner.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for compensating for channel distortions, comprising:
   evaluating a data pattern to be transmitted;
   determining if said data pattern satisfies one or more predefined criteria defining a clock-like data pattern; and
   generating a pre-emphasis level for said clock-like data patterns using a pre-emphasis circuit, wherein said pre-emphasis level is higher than a pre-emphasis level for said data patterns that do not satisfy said one or more predefined criteria.

2. The method of claim 1, wherein said determining step further comprises the step of determining if said data pattern satisfies said one or more predefined criteria defining said clock-like data pattern within a predefined window size.

3. The method of claim 1, wherein said generating step further comprises the step of generating said higher pre-emphasis level for one or more predefined data patterns.

4. The method of claim 1, wherein said evaluating and determining steps comprise the step of accessing a table to determine said pre-emphasis level based on said data pattern.

5. The method of claim 1, wherein said determining step further comprises the step of evaluating values of one or more adjacent bits within a predefined window.

6. The method of claim 1, wherein said one or more predefined criteria defining said clock-like data pattern characterize whether said data pattern exceeds a predefined frequency value.

7. The method of claim 1, wherein said one or more predefined criteria comprises one or more predefined data patterns.

8. The method of claim 1, wherein said one or more predefined criteria characterize whether said data pattern is a clock pattern or said clock-like data pattern within an observation window.

9. The method of claim 1, wherein a total number of pre-emphasis levels is comprised of said higher pre-emphasis level for said clock-like data patterns and said pre-emphasis levels for said data patterns that do not satisfy said one or more predefined criteria and wherein said total number of pre-emphasis levels exceeds a total number of bits in an observation window.

10. A circuit for compensating for channel distortions, comprising:
    a data pattern detector configured to evaluate a data pattern to be transmitted; and
    a pre-emphasis circuit configured to:
       determine if said data pattern satisfies one or more predefined criteria defining a clock-like data pattern; and generate a pre-emphasis level for said clock-like data patterns that is higher than a pre-emphasis level for said data patterns that do not satisfy said one or more predefined criteria.

11. The circuit of claim 10, wherein said pre-emphasis circuit is further configured to determine if said data pattern satisfies said one or more predefined criteria defining said clock-like data pattern within a predefined window size.

12. The circuit of claim 10, wherein said pre-emphasis circuit is further configured to generate said higher pre-emphasis level for one or more predefined data patterns.

13. The circuit of claim 10, wherein said pre-emphasis circuit is further configured to access a table to determine said pre-emphasis level based on said data pattern.

14. The circuit of claim 10, wherein said pre-emphasis circuit is further configured to evaluate values of one or more adjacent bits within a predefined window.

15. The circuit of claim 10, wherein said one or more predefined criteria defining said clock-like data pattern characterize whether said data pattern exceeds a predefined frequency value.

16. The circuit of claim 10, wherein said one or more predefined criteria comprises one or more predefined data patterns.

17. The circuit of claim 10, wherein said one or more predefined criteria characterize whether said data pattern is a clock pattern or said clock-like data pattern within an observation window.

18. The circuit of claim 10, wherein a total number of pre-emphasis levels is comprised of said higher pre-emphasis level for said clock-like data patterns and said pre-emphasis levels for said data patterns that do not satisfy said one or more predefined criteria and wherein said total number of pre-emphasis levels exceeds a total number of bits in an observation window.

19. An integrated circuit, comprising:

a circuit for compensating for channel distortions, comprising:

a data pattern detector configured to evaluate a data pattern to be transmitted; and a pre-emphasis circuit configured to:

determine if said data pattern satisfies one or more predefined criteria defining a clock-like data pattern; and generate a pre-emphasis level for said clock-like data patterns that is higher than a pre-emphasis level for said data patterns that do not satisfy said one or more predefined criteria.

20. The integrated circuit of claim 19, wherein said pre-emphasis circuit is further configured to determine if said data pattern satisfies said one or more predefined criteria defining said clock-like data pattern within a predefined window size.

* * * * *